United States Patent
Sugiyama

(10) Patent No.: US 6,473,581 B1
(45) Date of Patent: Oct. 29, 2002

(54) DRIVE APPARATUS FOR ROTATING A PHOTOSENSTIVE BODY AND IMAGE FORMING APPARATUS

(75) Inventor: Hideaki Sugiyama, Mishima (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/952,017

(22) Filed: Sep. 13, 2001

(51) Int. Cl.⁷ .............................................. G03G 15/00
(52) U.S. Cl. ...................................................... 399/167
(58) Field of Search .................................. 399/116, 117, 399/167; 474/111, 135, 136, 137, 237

(56) References Cited

U.S. PATENT DOCUMENTS 5,418,600 A * 5/1995 Genovese .................... 399/167

FOREIGN PATENT DOCUMENTS

| JP | 4-271361 | 9/1992 |
| JP | 10-026903 | 1/1998 |
| JP | 2001-241523 | * 9/2001 |

* cited by examiner

Primary Examiner—Hoang Ngo
(74) Attorney, Agent, or Firm—Frishauf, Holtz, Goodman & Chick, P.C.

(57) ABSTRACT

An image forming apparatus of the invention includes a guide member for guiding an photosensitive member to an arranged position, a toothed pulley attached to a shaft of the photosensitive member, a timing belt having teeth on an outer peripheral surface thereof, a mechanism for rotating the timing belt, a mechanism for applying tension to the timing belt, and a mechanism for holding the tension applying mechanism at a timing belt winding position. The tension applying mechanism supports the timing belt at a position where the toothed pulley engages with the timing belt, when the photosensitive member is moved to the arranged position. The tension applying mechanism moves the timing belt to a position where the timing belt is wound around the outer peripheral surface of the toothed pulley, when the photosensitive member has moved to the arranged position.

6 Claims, 5 Drawing Sheets

DRIVE APPARATUS FOR ROTATING A PHOTOSENSTIVE BODY AND IMAGE FORMING APPARATUS

BACKGROUND OF THE INVENTION

The present invention relates to an image forming apparatus mounted, e.g. in a copying machine, a printer, etc., to which color electrophotography is applied.

There is known an image forming apparatus adopted a method of electrophotography, wherein a drum with a shaft is used as a photosensitive member. The image forming apparatus having the photosensitive drum is equipped with a drive apparatus for rotating the photosensitive drum.

This type of image forming apparatus is disclosed in Jpn. Pat. Appln. KOKAI Publication No. 10-26903. The drive apparatus provided in the image forming apparatus uses a timing belt with teeth on its outer periphery as a torque transmission member. The timing belt is rotatably put around a plurality of support pulleys. A lower portion of the timing belt is engaged with a toothed pulley for driving. The drive apparatus is equipped with a tension applying mechanism for applying a tension at the lower portion of the timing belt.

The shaft of the photosensitive drum is attached to a toothed pulley. The photosensitive drum is located on the upper side of the timing belt and is detachably attached to the main body of the image forming apparatus. The toothed pulley of the photosensitive drum is engaged with an upper portion of the timing belt. When the driving toothed pulley is rotated, the timing belt is rotated. Further, the photosensitive drum is rotated via the toothed pulley for the drum.

This drive apparatus, however, has the following problem. The timing belt is provided with tension by the tension applying mechanism and is thus tightly stretched. As the photosensitive drum is set on the upper side of the timing belt, the toothed pulley for the drum comes in contact with the upper portion of the timing belt and pushes the timing belt inward (downward) into the area surrounded by the timing belt. When an outward (upward) force from the timing belt effect to the toothed pulley for the drum, the photosensitive drum may lift from the arranged position. It is thus necessary to fix the photosensitive drum to the main body of the image forming apparatus using mechanical means such as bolts, for preventing the photosensitive drum from lifting, against the force of the timing belt. This makes very difficult the operation of attaching the photosensitive drum to the main body of the image forming apparatus.

In addition, when the photosensitive drum is attached to the main body of the image forming apparatus, if the drum has been arranged at a position displaced from a preset arranged position, the teeth of the timing belt may be damaged by effecting a load to the timing belt and shifting the timing belt. In this case, a torque is not smoothly transmitted from the timing belt to the toothed pulley for the drum, and image formation is suffered a harmfle effect. It is thus necessary to fit the photosensitive drum precisely to a desired location. However, when the photosensitive drum is arranged on the upper side of the timing belt, it is difficult to fit the photosensitive drum precisely desired location and to exactly engage the photosensitive drum with the timing belt.

BRIEF SUMMARY OF THE INVENTION

The purpose of the present invention is to provide a drive apparatus and an image forming apparatus having the drive apparatus, which is easy to operate attaching a photosensitive member to a main body of an image forming apparatus, which is possible to fit the photosensitive member precisely to a arranged location in the main body and to exactly engage the photosensitive member with a timing belt, and which can obtain a high-quality image.

According to the present invention, a photosensitive member is guided by a guide member so that the photosensitive member can easily and precisely be fit at an arranged position. When the photosensitive member has been moved to the arranged portion of the guide member, as the timing belt is pushed by a toothed pulley and wound around an outer peripheral surface of the toothed pulley, the timing belt is held at the wound position. Thus it can be avoid damaging the teeth of the timing belt, and lifting the photosensitive member from the arranged position, because the toothed pulley of the photosensitive member is exactly engaged with the timing belt.

A driving apparatus of the invention for supporting and rotating a photosensitive member with a shaft comprises: a guide member which guides the photosensitive member to an arranged position, the guide member including an attached portion which rotatably supports the photosensitive member at the arranged position, an insert/extract portion where the photosensitive member is inserted and extracted at an insert/extract position, and a guiding portion which guides the photosensitive member between the attached portion and the insert/extract portion in a direction perpendicular to an axial direction of the photosensitive member; a toothed pulley having teeth on an outer peripheral surface thereof and attached to the shaft of photosensitive member; a timing belt having teeth on an outer peripheral surface thereof; a plurality of support pulleys which support rotatably the timing belt as being wound around; a mechanism which rotates the timing belt; a tension applying mechanism which applies tension to the timing belt, the tension applying mechanism supporting the timing belt at a waiting position where the toothed pulley is in contact with the timing belt when the photosensitive member moves along the guiding portion of the guide member toward the attached portion, and the tension applying mechanism moving the timing belt to a winding position where the timing belt is wound around the outer peripheral surface of the toothed pulley centering at a contact portion been in contact with the toothed pulley when the photosensitive member has moved to the attached portion of the guide member; and a holding mechanism which maintains the timing belt in the winding position by the tension applying mechanism.

An image forming apparatus of the invention comprises an apparatus main body, a photosensitive member with a shaft, and a driving apparatus provided on the apparatus main body and supports and rotates the photosensitive member, wherein the driving apparatus comprises: a guide member which guides the photosensitive member to an arranged position, the guide member including an attached portion which rotatably supports the photosensitive member at the arranged position, an insert/extract portion where the photosensitive member is inserted and extracted at an insert/extract position, and a guiding portion which guides the shaft of the photosensitive member between the attached portion and the insert/extract portion in a direction perpendicular to an axial direction of the photosensitive member; a toothed pulley having teeth on an outer peripheral surface thereof and attached to the photosensitive member; a timing belt having teeth on an outer peripheral surface thereof; a plurality of support pulleys which supports rotatably the timing belt as being wound around; a mechanism which rotates the timing belt; a tension applying mechanism which applies tension to the timing belt, the tension applying mechanism supporting the timing belt at a waiting position where the toothed pulley is in contact with the timing belt when the photosensitive member moves along the guiding portion of the guide member toward the attached portion, and the tension applying mechanism moving the timing belt to a winding position where the timing belt is wound around the outer peripheral surface of the toothed pulley centering at a contact portion been in contact with the toothed pulley when the photosensitive member has moved to the guiding portion of the guide member; and a holding mechanism which maintains a state winding the timing belt around the outer peripheral surface of the toothed pulley by the tension applying mechanism.

A method of the invention for attaching a photosensitive member with a shaft to an apparatus main body of an image forming apparatus comprises: a step of preparing a guide member including an attached portion which rotatably supports the shaft of the photosensitive member at the attachment position, an insert/extract portion where is inserted and extracted the shaft of the photosensitive member at an insert/extract position, and a guiding portion which guides the photosensitive member between the attached portion and the insert/extract portion in a direction perpendicular to an axial direction of the photosensitive member; a step of rotatably supporting a timing belt having teeth on an outer peripheral surface thereof by means of a plurality of pulleys; a step of applying tension to the timing belt; a step of bringing a toothed pulley provided on the photosensitive member into contact with the timing belt when the photosensitive member is moved along the guiding portion of the guide member toward the attached portion; a step of moving the timing belt to a winding position where the timing belt is wound around an outer peripheral surface of the toothed pulley centering at a contact portion contacted with the toothed pulley when the photosensitive member has moved to the guiding portion of the guide member; and a step of holding the timing belt in the winding position.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An image forming apparatus according to a first embodiment of the present invention will now be described with reference to FIGS. 1 and 2.

Figure 1:
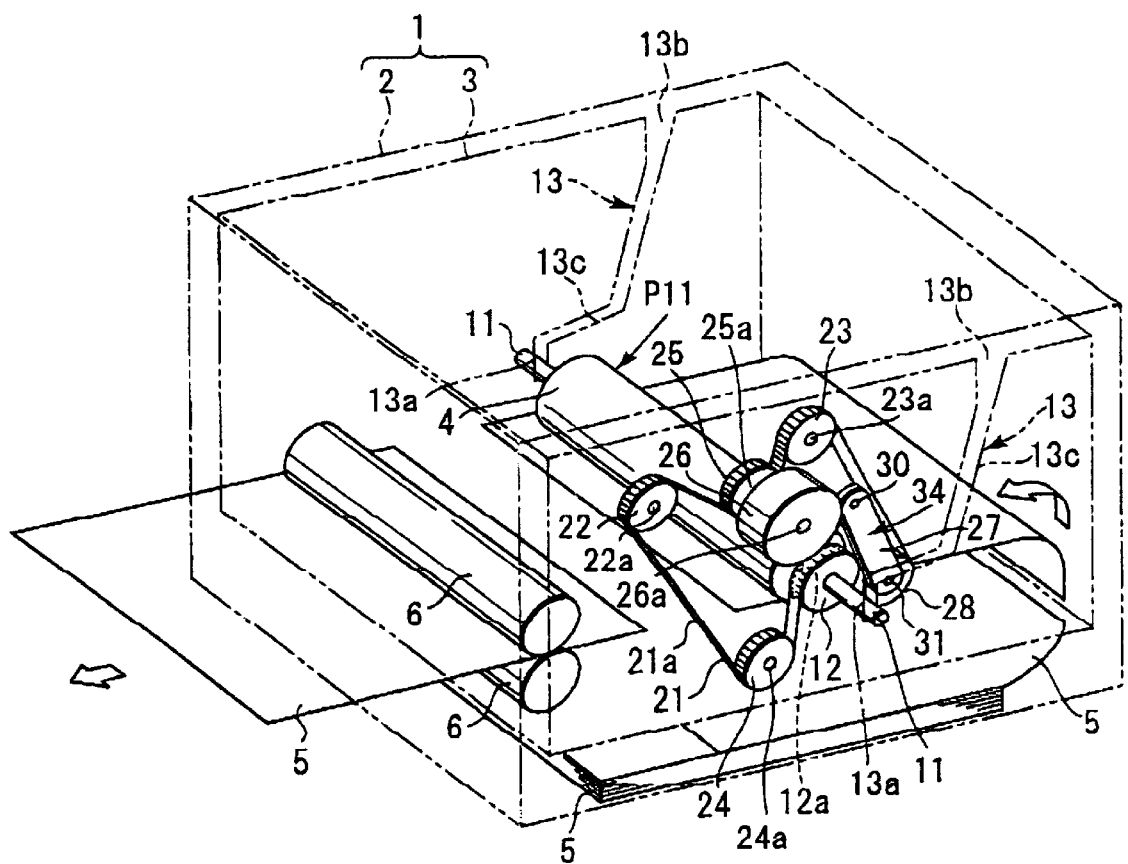
FIG. 1 schematically shows an image forming apparatus according to a first embodiment of the present invention.

FIG. 1 schematically shows the structure of an apparatus for rotating a photosensitive drum in an image forming apparatus. An apparatus main body 1 of the image forming apparatus is constructed by combining a cover 2 and a frame 3. The cover 2 is a quadrangular boxy shape and constitutes a surface portion of the apparatus main body 1. The frame 3 constitutes a framework of the apparatus main body 1 and is situated within the cover 2. The apparatus main body 1 is provided a mechanism for forming an image on a recording paper by electrophotography in inside of it.

The elements; a photosensitive drum 4, an exposing mechanism (not shown), a developing mechanism (not shown), a transferring mechanism (not shown), and a fixing mechanism (not shown); are provided for composing the mechanism for image forming. The exposing mechanism forms an electrostatic latent image on a surface of the photosensitive drum 4. The developing mechanism develops the electrostatic latent image on the photosensitive drum 4 and forms a toner image. The transferring mechanism transfers the toner image on the photosensitive drum 4 onto a recording paper 5. The fixing mechanism fixes the toner image on the recording paper. In the apparatus main body 1, recording paper 5 are stored below the photosensitive drum 4. The recording paper 5 is conveyed to the photosensitive drum 4 and formed a toner image. A pair of output rollers 6 are provided within the apparatus main body 1. The output rollers 6 let out the recording paper 5, which has passed through the fixing mechanism, to the outside of the apparatus main body 1.

The apparatus main body 1 includes a drive mechanism, which supports and rotates the photosensitive drum 4. The drive mechanism will now be described with reference to FIGS. 2A, 2B and 2C, too.

The photosensitive drum 4 shaped cylindrical has a shaft 11 attached along the center axis of the photosensitive drum. The shaft 11 is a cylindrical rod. Both end portions of the shaft 11 project out of both end faces of the photosensitive drum 1. A toothed pulley 12 is attached to one of the end portions of the shaft 11. The toothed pulley 12 is formed many teeth 12a arranged on its outer peripheral surface as shown in FIG. 1.

Guide paths 13 serving as guide members are formed on a pair of opposing wall portions of the frame 3. Each guide path 13 is a long slit. The paired guide paths 13 hold the photosensitive drum for being inserted both end portions of the shaft 11 of the photosensitive drum 4. Each guide path 13 includes an attached portion 13a, an insert/extract portion 13b and a guiding portion 13c. The guiding portions 13a are vertically formed at the arranged position P11 to horizontally attach the photosensitive drum 4 at a preset arranged position P11 in the apparatus main body 1. The insert/extract portions 13b are opened at a preset insert/extract position at upper edges of the frame 3. The insert/extract portions 13b allow the shaft 11 of photosensitive drum 4 to be taken out from the paired guide paths 13 to the outside of the apparatus main body 1, and they allow the shaft 11 of photosensitive drum 4 to be inserted from the outside of the apparatus main body 1 into the paired guide paths 13. The guiding portions 13c are areas over where the shaft 11 of photosensitive drum 4 is guided and moved between the attached portions 13a and the insert/extract portions 13b. Each guide portion 13c includes a vertical portion continuing to the insert/extract portion 13b and a horizontal portion continuing to the attached portion 13a.

Thus the photosensitive drum 4 can be placed at the arranged position P11 caused by setting the photosensitive drum 4 horizontally, inserting both end portions of the shaft 11 in the paired guide paths 13, and moving to the attached portions 13a.

Figure 2A:
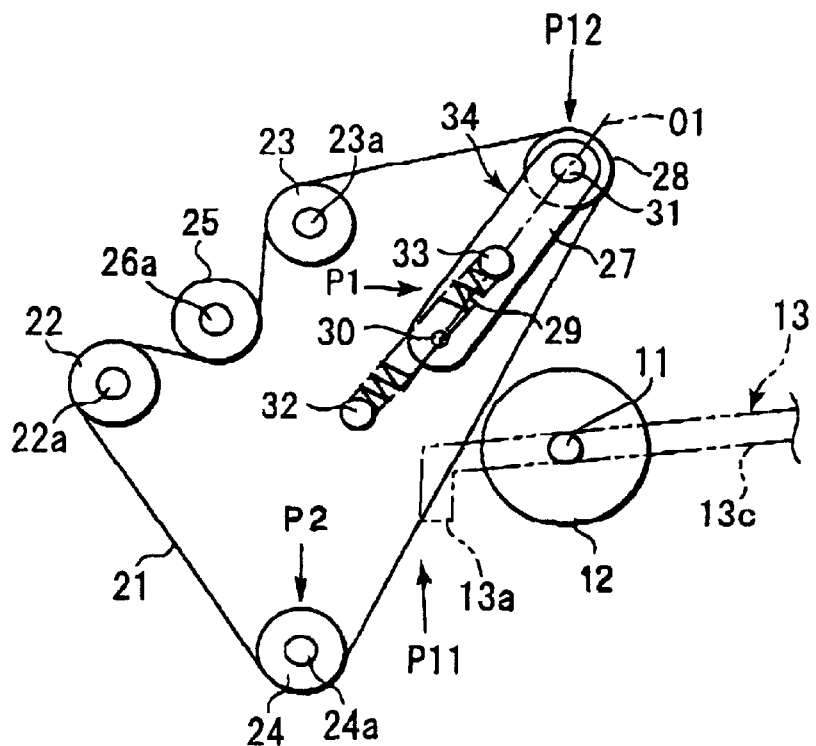
FIG. 2A illustrates an operation of a drive apparatus provided in the image forming apparatus according to the first embodiment.

A timing belt 21 is wound around support pulleys 22, 23 and 24 on one of inner side of walls of the frame 3 of apparatus main body 1, at which the guide paths are formed. The timing belt 21 is endless. As shown in FIG. 1, the timing belt 21 is formed many teeth 21a arranged on its outer peripheral surface. The support pulleys 23, 24 and 25 are arranged apart from each other near the attached portions 13a of paired guide paths 13, and rotatably assembled to shafts 22a, 23a and 24a attached to the frame 3. For example, as shown in FIG. 2A, the support pulleys 23 and 24 are placed at a first position P1 and a second position P2, separated from the attached portions 13a and opposed to each other. The support pulley 24 is arranged at the second position. The shafts 22a, 23a and 24a for assembling the support pulleys 22, 23 and 24 are parallel to the shaft 11 of the photosensitive drum 4 placed at the arranged position P11. The timing belt 21 is rotatably set around the support pulleys 22, 23 and 24 so as to surround them from the outside.

A driving toothed pulley 25 is placed between the support pulley 23 and support pulley 24. The toothed pulley 25 has many teeth 25a on its outer peripheral surface as shown in FIG. 1. The toothed pulley 25 is put in contact with the timing belt 21 and engaged with the teeth 21a. The toothed pulley 25 adds tension to the timing belt 21, for pushing the timing belt 21, which is located between the support pulley 23 and support pulley 24, inward of the area surrounded by the timing belt 21.

A motor 26 is attached on the outside of the wall of the frame 3, on which the timing belt 13 is provided. A drive shaft 26a of the motor 26 is passed through the wall and projects inward. The toothed pulley 25 is attached to the drive shaft 26a of motor 26 and driven by the motor 26.

A lever 27, a tension pulley 28 and a tension coil spring 29 serving as a resilient member are provided at the first position P1, which is a part of the area surrounded by the timing belt 21. It means that a mechanism 34 comprises the lever 27, pulley 28 and tension coil spring 29. The lever 27 is placed in parallel to the timing belt 21. One end portion of the lever 27 is located toward mid of the area surrounded by the timing belt 21 and is rotatably attached to a fulcrum shaft 30. The other end portion of the lever 27 is directed outward of the area surrounded by the timing belt 21. The fulcrum shaft 30 is parallel to the shaft 11 of photosensitive drum 4 and is attached to the wall of frame 3. The tension pulley 28 is rotatably attached to the other end of the lever 27 by means of a pulley shaft 31. The tension pulley 28 supports rotatably the timing belt 21 for contacting with the inner peripheral surface of the timing belt 21. The lever 27 and tension pulley 28 add tension to the timing belt 21 by pushing the timing belt 21 outward of the area surrounded by the timing belt 21.

In the area surrounded by the timing belt 21, the lever 27 rotates on the fulcrum shaft 30 between a waiting position P12 and a winding position P13. The waiting position P12 is a position where the toothed pulley 12 of photosensitive drum 4 contacts the timing belt 21 between the tension pulley 28 and support pulley 24 from the outside, when the photosensitive drum 4 moves along the guiding portions 13c of paired guide paths 13 toward the attached portions 13a.

The lever 27 is rotated from the waiting position P12 toward the toothed pulley 12 for pulling by the timing belt 21, and then reached the winding position P13.

The winding position P13 is where the photosensitive drum 21 moves to the attached portions (arranged position P11) of guide paths 13 and the timing belt 21 between the tension pulley 28 and support pulley 24 winds widely around the outer peripheral surface of the toothed pulley 12 by centering the contact portion with the toothed pulley. At the winding position P13, the timing belt 21 is deeply pushed by the toothed pulley 12 inward of the area surrounded by the timing belt 21. The lever 27 is rotated to the winding position P13 for pulling by the timing belt 27.

The tension coil spring 29 is situated in the direction of the length of the lever 27. One end portion of the tension coil spring 29 is supported by a shaft 32 attached to the frame 3, and the other end portion is supported by a shaft 33 attached to a middle portion of the lever 27. When the lever 27 is in the waiting position P12, the tension coil spring 29 is located opposite to the winding position P13 interposing a center axis O1 of lever 27 and adds force to the lever 27 toward the waiting position P12. The tension coil spring 29 moves toward the winding position P13 side for passing the center axis O1 of lever 27 while the lever 27 rotates from the waiting position P12 to the winding position P13. When the lever 27 exists in the winding position, the tension coil spring 29 adds force toward the winding position P13. The center axis O1 of lever 27 is a line connecting the fulcrum shaft 30 and the shaft 32 of the pulley 31 and extending in the direction of the length of the lever.

The mechanism 34 having the lever 27, pulley 28 and tension coil spring 29 constitutes both a tension applying mechanism and a holding mechanism. In other words, the tension applying mechanism and the holding mechanism are composed of common parts. The tension applying mechanism is a mechanism for adding tension to the timing belt 21. The holding mechanism is a mechanism for holding the tension applying mechanism at the wind position P13.

An operation for attaching the photosensitive drum 21 to the frame 3 will now be described. Before the photosensitive drum 4 is attached, the lever 27 waits at the waiting position P12, as shown in FIG. 2A. Both end portions of the shaft 11 are inserted into the guide portions 13c from the insert/extract portions 13b of the paired guide paths 13 of frame 3 for making the photosensitive drum 4 horizontally. The toothed pulley 12 is in the same direction as the wall of frame 3, on which the timing belt 21 is provided. The shaft 11 is moved toward the attached portions 13a along the guiding portions 13c of the paired guide paths 13. The shaft 11 moves vertically and then horizontally along the guiding portions 13c. The toothed pulley 12 also moves together. Thus, the photosensitive drum 4 moves from the outside of the frame 3 to the inside arranged position P11.

When the photosensitive drum 4 has approached the arranged portions 13a in the paired guide portions 13c, the toothed pulley 12 contacts with the timing belt 21 between the tension pulley 28 and support pulley 24 at the wait position P12 by pushing from outside. The toothed pulley 12 engages the timing belt 21. FIG. 2A shows this motion.

The shaft 11 of photosensitive drum 4 moves toward and stops at the attached portions 13a of paired guide paths 13. The shaft 11 turns from the horizontal paths of the guiding portions 13c to the vertical paths, and gets into the attached portions 13a. Accordingly, even if the shaft 11 moves upward, the shaft 11 is prevented from getting out from the attached portions 13a by hitting against the bent portion between the attached portions 13a and guiding portions 13c. Thereby, the photosensitive drum 4 is set at the arranged position P11.

Figure 2B:
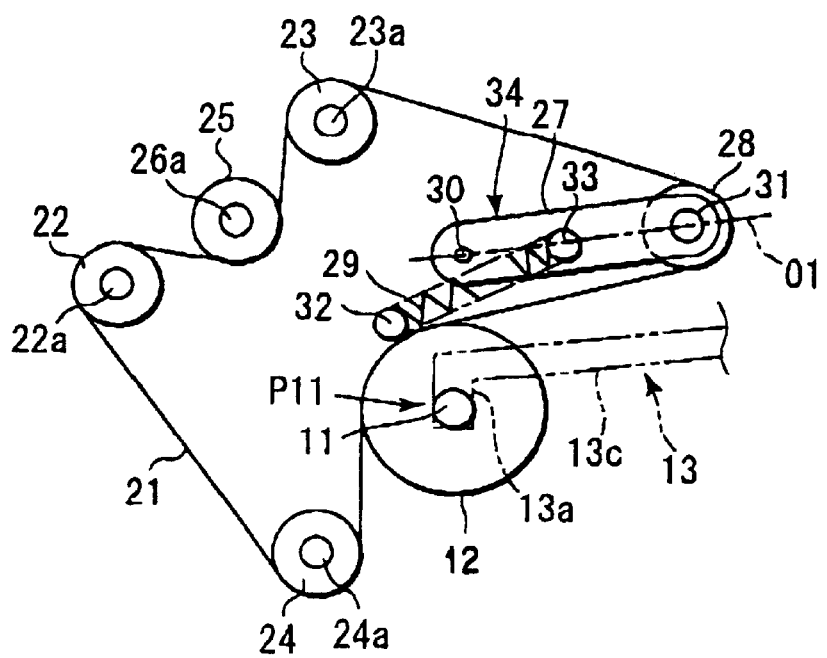
FIG. 2B illustrates the operation of the drive apparatus provided in the image forming apparatus according to the first embodiment.

The timing belt 21 is further pushed by the toothed pulley 12 inward of the area surrounded by the timing belt 21. The lever 27 is pulled by the timing belt 21 and rotated from the waiting position P12 toward the winding position P13 against the force of the tension coil spring 29. As the timing belt 21 moves toward the winding position P13 centering at contact portion contacted with the toothed pulley 12, the timing belt 21 is wound around the outer peripheral surface of the toothed pulley 12. The wound timing belt 21 engages the toothed pulley 12. While the lever 27 rotates from the waiting position P12 to the winding position P13, the tension coil spring 29 moves beyond the center axis O1 of the lever 27 as passing over the side of the winding position P13. FIG. 2B shows this motion.

Figure 2C:
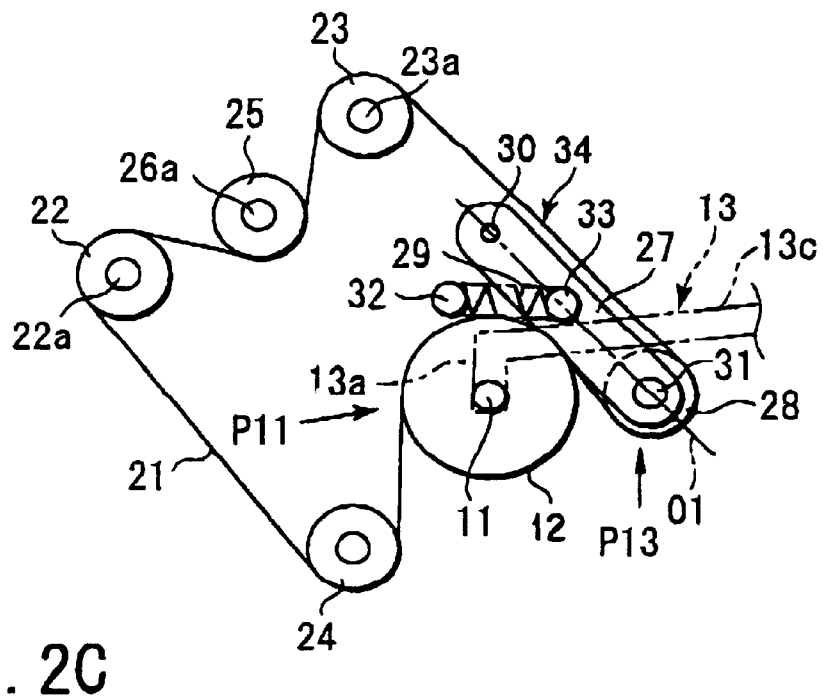
FIG. 2C illustrates the operation of the drive apparatus provided in the image forming apparatus according to the first embodiment.

When the lever 27 has been moved to the winding position P13, the tension coil spring 29 adds resilient force to the lever 27 toward the winding position P13. Thus, the lever 27 is rapidly rotated toward the winding position P13 as being pulled by the tension coil spring 29. The lever 27 stops by hitting against the outer peripheral surface of toothed pulley 12. The timing belt 21 is widely wound around the outer peripheral surface of the toothed pulley 12 and is engaged therewith. The lever 27 pushes the timing belt 21 wound around the pulley 12 from the outside and adds force to the lever 27 to push the timing belt 21. FIG. 2C shows this motion.

Thereby, the photosensitive drum 4 is attached to the arranged position P11, and the timing belt 21 is kept engaging with the toothed pulley 12.

Figure 3A:
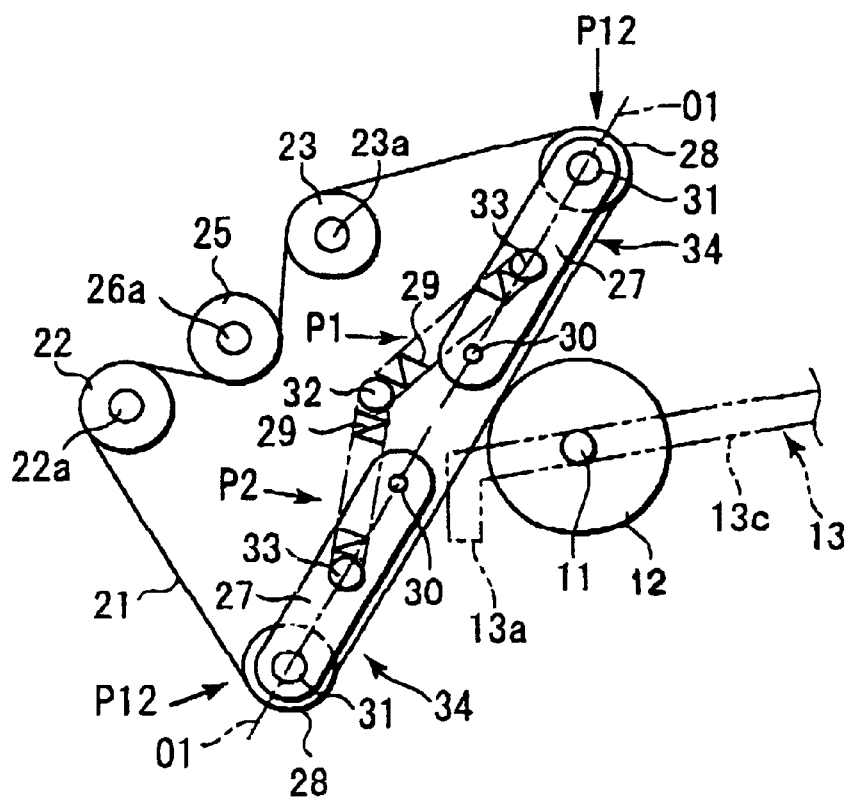
FIG. 3A illustrates an operation of a drive apparatus provided in an image forming apparatus according to a second embodiment.
Figure 3B:
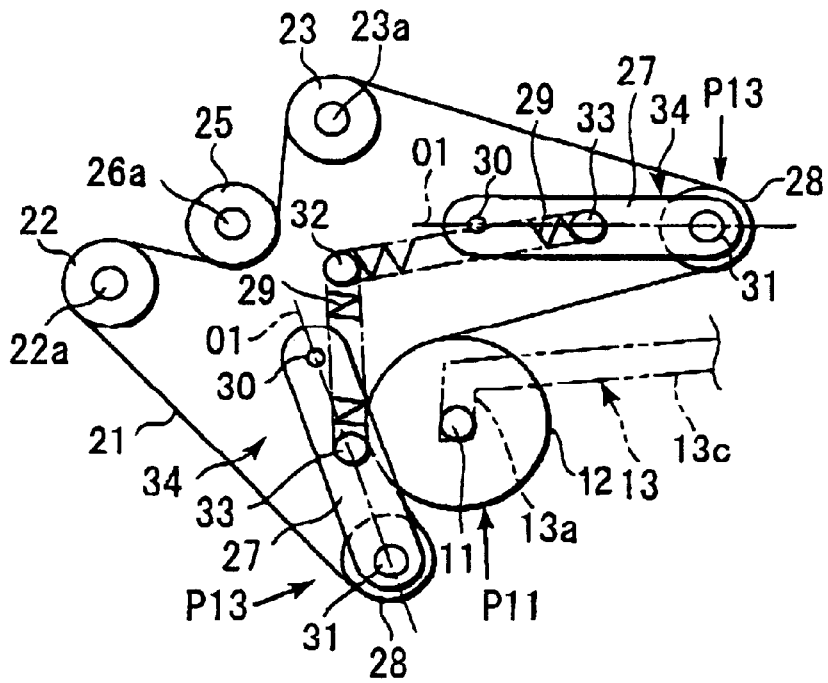
FIG. 3B illustrates the operation of the drive apparatus provided in the image forming apparatus according to the second embodiment.

A second embodiment will now be described with reference to FIG. 3A and FIG. 3B. FIG. 3A and FIG. 3B illustrate the motion for attaching the photosensitive drum to the main body of the image forming apparatus. In FIG. 3A and FIG. 3B, the parts as same as the parts in FIGS. 2A, 2B and 2C are denoted by same reference numerals. In this embodiment, the mechanism 34 (tension applying mechanism and holding mechanism) comprising the lever 27, pulley 28 and tension coil spring 29 is provided at each of first position P1 and second position P2 which are opposed to each other interposing the arranged position P11.

Before the photosensitive drum 4 is set at the arranged position P11, the two mechanisms 34 stand at waiting positions P12. FIG. 3A shows this condition. When the photosensitive drum 4 is brought to the attached portions 13a along the guide paths 13, the two mechanisms 34 move to the winding position P13 and wind the timing belt 21 around the toothed pulley 12. The two mechanisms 34 can more certainly maintain the condition in which the timing belt 21 is wound around the toothed pulley 12. FIG. 3B shows this condition.

Figure 4A:
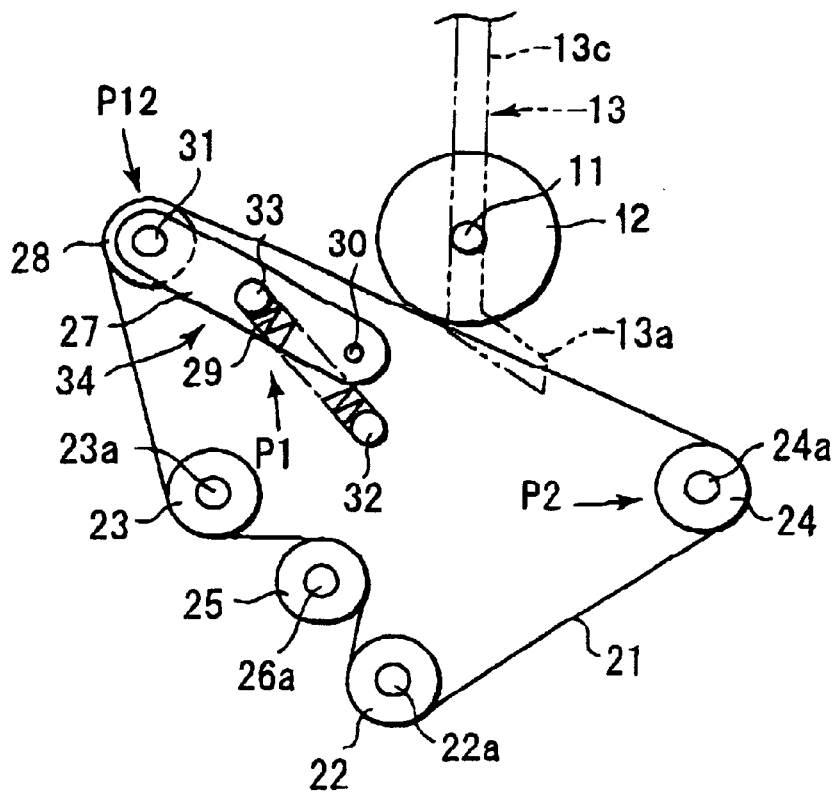
FIG. 4A illustrates an operation of a drive apparatus provided in an image forming apparatus according to a third embodiment.
Figure 4B:
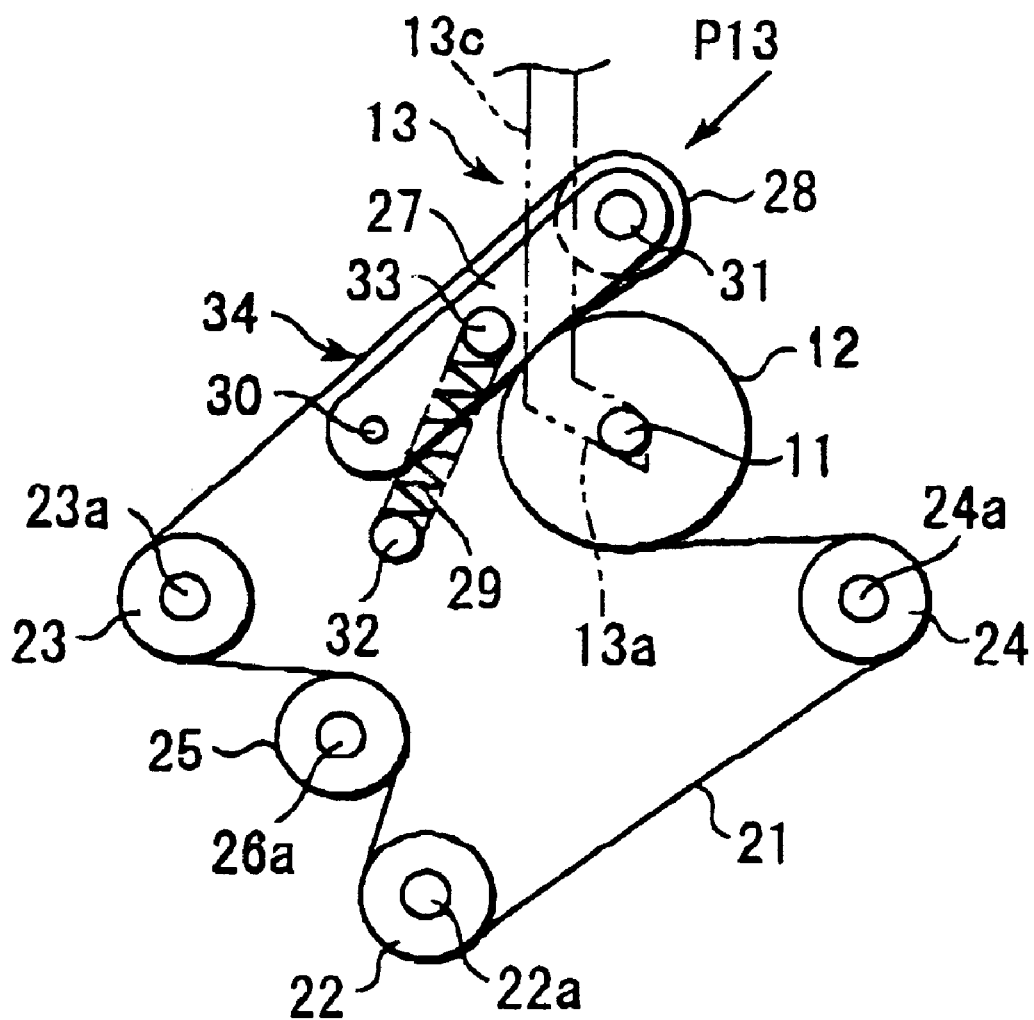
FIG. 4B illustrates the operation of the drive apparatus provided in the image forming apparatus according to the third embodiment.

A third embodiment will now be described with reference to FIG. 4A and FIG. 4B. In FIG. 4A and FIG. 4B, the parts as same as the parts in FIGS. 2A, 2B and 2C are denoted by same reference numerals. In this embodiment, the portion of the guiding portion 13c of guide path 13, which is continuous with the attached portion 13a, is formed vertically, and the attached portion 13a is formed horizontally. FIG. 4A and FIG. 4B illustrate the motion for attaching the photosensitive drum to the main body of the image forming apparatus. FIG. 4A shows the condition in which the mechanism 34 is in the waiting position P12, and FIG. 4B shows the condition in which the mechanism 34 is in the winding position P13.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A drive apparatus for supporting and rotating a photosensitive member with a shaft, the apparatus comprising:

a guide member which guides the photosensitive member to an arranged position, the guide member including an attached portion which rotatably supports the photosensitive member at the arranged position, an insert/extract portion where the photosensitive member is inserted and extracted at an insert/extract position, and a guiding portion which guides the photosensitive member between the attached portion and the insert/extract portion in a direction perpendicular to an axial direction of the photosensitive member;

a toothed pulley having teeth on an outer peripheral surface thereof and attached to the photosensitive member;

a timing belt having teeth on an outer peripheral surface thereof;

a plurality of support pulleys which support rotatably the timing belt as being wound around;

a mechanism which rotates the timing belt;

a tension applying mechanism which applies tension to the timing belt, the tension applying mechanism supporting the timing belt at a waiting position where the toothed pulley is in contact with the timing belt when the photosensitive member moves along the guiding portion of the guide member toward the attached portion, and the tension applying mechanism moving the timing belt to a winding position where the timing belt is wound around the outer peripheral surface of the toothed pulley by centering at a contact portion contacted with the toothed pulley when the photosensitive member has moved to the attached portion of the guide member; and a holding mechanism which maintains the tension applying mechanism in a state in which the timing belt has been moved to the winding position.

2. A drive apparatus according to claim 1, wherein said tension applying mechanism and said holding mechanism comprise a common pulley which rotatably supports the timing belt in contact with an inner peripheral surface of the timing belt, a common lever which supports said common pulley and rotates between the waiting position and the winding position, and a common resilient member joined to the lever and effecting resilient force to the lever in directions toward the waiting position and the winding position.

3. A drive apparatus according to claim 1, wherein said tension applying mechanism and said holding mechanism are provided at least one of first and second positions of the timing belt where are opposed to each other, interposing the photosensitive drum located at the arranged position.

4. A drive apparatus according to claim 1, wherein said guide member is formed by a continuous groove which has the attached portion, the insert/extract portion and the guiding portion.

5. An image forming apparatus comprising:
   an apparatus main body;
   a photosensitive member with a shaft; and
   a driving apparatus provided on the apparatus main body and supports and rotates the photosensitive member,
   wherein the driving apparatus comprises:
   a guide member which guides the photosensitive member to an arranged position, the guide member including an attached portion which rotatably supports the photosensitive member at the arranged position, an insert/extract portion where the photosensitive member is inserted and extracted at an insert/extract position, and a guiding portion which guides the photosensitive member between the attached portion and the inset/extract portion in a direction perpendicular to an axial direction of the photosensitive member;
   a toothed pulley having teeth on an outer peripheral surface thereof and attached to the photosensitive member;
   a timing belt having teeth on an outer peripheral surface thereof;
   a plurality of support pulleys supporting rotatably the timing belt as being wound around;
   a mechanism which rotates the timing belt;
   a tension applying mechanism which applies tension to the timing belt, the tension applying mechanism supporting the timing belt at a waiting position where the toothed pulley is in contact with the timing belt when the photosensitive member moves along the guiding portion of the guide member toward the attached portion, and the tension applying mechanism moving the timing belt to a winding position where the timing belt is wound around the outer peripheral surface of the toothed pulley centering at a contact portion contacted with the toothed pulley when the photosensitive member has moved to the attached portion of the guide member; and
   a holding mechanism which maintains the tension applying mechanism in a state in which the timing belt has been moved to the winding position.

6. A method of attaching a photosensitive member with a shaft to an apparatus main body of an image forming apparatus, the method comprising:
   a step of preparing a guide member including an attached portion which rotatably supports the photosensitive member at the arranged position, an insert/extract portion where the photosensitive member is inserted and extracted at an insert/extract position, and a guiding portion which guides the shaft of the photosensitive member between the attached portion and the insert/extract portion in a direction perpendicular to an axial direction of the photosensitive member;
   a step of rotatably supporting a timing belt having teeth on an outer peripheral surface thereof by means of a plurality of pulleys;
   a step of applying tension to the timing belt;
   a step of bringing a toothed pulley provided on the photosensitive member into contact with the timing belt when the photosensitive member is moved along the guiding portion of the guide member toward the attached portion;
   a step of moving the timing belt to a winding position where the timing belt is wound around an outer peripheral surface of the toothed pulley centering at a contact portion contacted with the toothed pulley when the photosensitive member has moved to the guiding portion of the guide member; and
   a step of holding the timing belt in the winding position.

* * * * *